United States Patent [19]

Kawaguchi et al.

[11] Patent Number: 5,974,570
[45] Date of Patent: Oct. 26, 1999

[54] METHOD FOR MANAGING DATA PROCESSING SYSTEM AND HIGH-RELIABILITY MEMORY

[75] Inventors: Atsuo Kawaguchi; Hiroshi Motoda, both of Saitama-ken, Japan

[73] Assignee: Hitachi, Ltd., Tokyo, Japan

[21] Appl. No.: 08/608,568

[22] Filed: Feb. 28, 1996

Related U.S. Application Data

[60] Division of application No. 08/219,263, Mar. 29, 1994, abandoned, which is a continuation-in-part of application No. 08/039,761, Mar. 30, 1993, Pat. No. 5,557,771, which is a continuation-in-part of application No. 07/801,351, Dec. 2, 1991, Pat. No. 5,253,212.

[30] Foreign Application Priority Data

| Dec. 1, 1990 | [JP] | Japan | 2-400077 |
| Mar. 30, 1992 | [JP] | Japan | 4-073681 |
| Mar. 30, 1993 | [JP] | Japan | 5-071510 |
| Sep. 7, 1993 | [JP] | Japan | 5-221694 |

[51] Int. Cl.$^6$ ................................................. G06F 11/00
[52] U.S. Cl. ................................. 714/42; 714/54; 714/719
[58] Field of Search .................................. 371/21.1, 21.2, 371/67.1, 68.1, 68.2; 395/183.18, 185.07, 185.01; 714/42, 54, 48, 718, 819, 719

[56] References Cited

U.S. PATENT DOCUMENTS

| 3,351,913 | 11/1967 | Pine | 365/230.01 |
| 3,745,316 | 7/1973 | Olah | 395/185.07 |
| 4,491,910 | 1/1985 | Caudel et al. | 365/230.03 |
| 4,549,283 | 10/1985 | McDermott, III | 365/236 |
| 4,686,621 | 8/1987 | Keely et al. | 371/21.1 |
| 4,715,034 | 12/1987 | Jacobson | 395/185.07 |
| 4,777,586 | 10/1988 | Matsubara et al. | 395/183.18 |
| 4,811,299 | 3/1989 | Myazawa et al. | 371/21.1 |
| 4,819,211 | 4/1989 | Takagi | 365/230.01 |
| 4,821,240 | 4/1989 | Nakamura et al. | 365/228 |
| 4,860,259 | 8/1989 | Tobita | 365/201 |
| 4,969,148 | 11/1990 | Nadeau-Dostie et al. | 371/21.1 |
| 5,058,076 | 10/1991 | Kiuchi | 365/230.01 |
| 5,182,805 | 1/1993 | Campbell | 395/650 |
| 5,299,202 | 3/1994 | Vaillancourt | 371/11.1 |
| 5,375,225 | 12/1994 | Dean et al. | 395/500 |

*Primary Examiner*—Dieu-Minh T. Le
*Attorney, Agent, or Firm*—Antonelli, Terry, Stout & Kraus

[57] ABSTRACT

A method of managing a memory area, in a data processing system, comprising providing a managing information memory area for items of in use, test done, and temporary fault of pages in a page table for managing a memory unit. In accordance with such a scheme, when a page is allocated to a program, an operation test is conducted on a page not tested, the time when the operation test has been conducted is recorded, and an operation test is again conducted on a page for which a predetermined time has passed since the last test performed thereat. Also, the values of output signals of main and sub memory modules of the data processing system are compared while the data processing system is operating, and if a difference is found, that is, non-coincidence is detected, this difference is detected as a fault by the test.

11 Claims, 5 Drawing Sheets

METHOD FOR MANAGING DATA PROCESSING SYSTEM AND HIGH-RELIABILITY MEMORY

CROSS-REFERENCE TO RELATED APPLICATIONS

This application is a divisional of U.S. application Ser. No. 08/219,263, filed Mar. 29, 1994, now abandoned, which, in turn, is a continuation-in-part of U.S. application Ser. No. 08/039,761, entitled "DATA PROCESSING SYSTEM AND STORAGE DEVICE FOR THE SAME", filed on Mar. 30, 1993, now U.S. Pat. No. 5,557,771, the disclosure of which is herein incorporated by reference, and which in turn, is a continuation-in-part of U.S. application Ser. No. 07/801,351, entitled "SEMICONDUCTOR MEMORY IC AND SEMICONDUCTOR MEMORY DEVICE", filed Dec. 2, 1991, and now patented as U.S. Pat. No. 5,253,212 issued on Dec. 10, 1993, the disclosure of which is herein incorporated by reference.

BACKGROUND OF THE INVENTION

This invention relates to a data processing system.

In the conventional data processing system, in order to improve its reliability by hardware, the system is multiplexed to incorporate a plurality of modules having the same function which are used simultaneously, and a comparison module is used to collect and compare results outputted from the modules to confirm that the results are the same.

So, another problem is that the multiplexed data processing system has a complicated structure and the cost is increased.

SUMMARY OF THE INVENTION

The present invention proposes to mount comparators to bus buffers such that the comparators are connected between memory modules and a bus to realize in simple form the multiplexing of the data processing system to improve its reliability by hardware without incurring great cost.

In a multiplexed system using bus buffers, the comparators mounted in the bus buffers and connecting the memory modules and the bus are used to compare values of the signals in the memory modules and a value of the corresponding signal on the bus. A plurality of memory modules, provided for multiplexing purposes, output results simultaneously, and respectively compare the value of the signal therein with the value of the signal on the bus, and if there is any difference, treat it as an error.

The coincidence of the results outputted by the plurality of memory modules is achieved by detecting a coincidence of the value of the signal on the bus with the values of the signals in the memory modules. This arrangement makes it possible to multiplex the system without using a comparison module which collects results outputted by the memory modules, and compares the results to confirm that the results coincide with one another.

DESCRIPTION OF THE PREFERRED EMBODIMENTS

An embodiment of the present invention to improve the reliability of the data processing system by hardware will be described with reference to the accompanying drawings.

Figure 1:
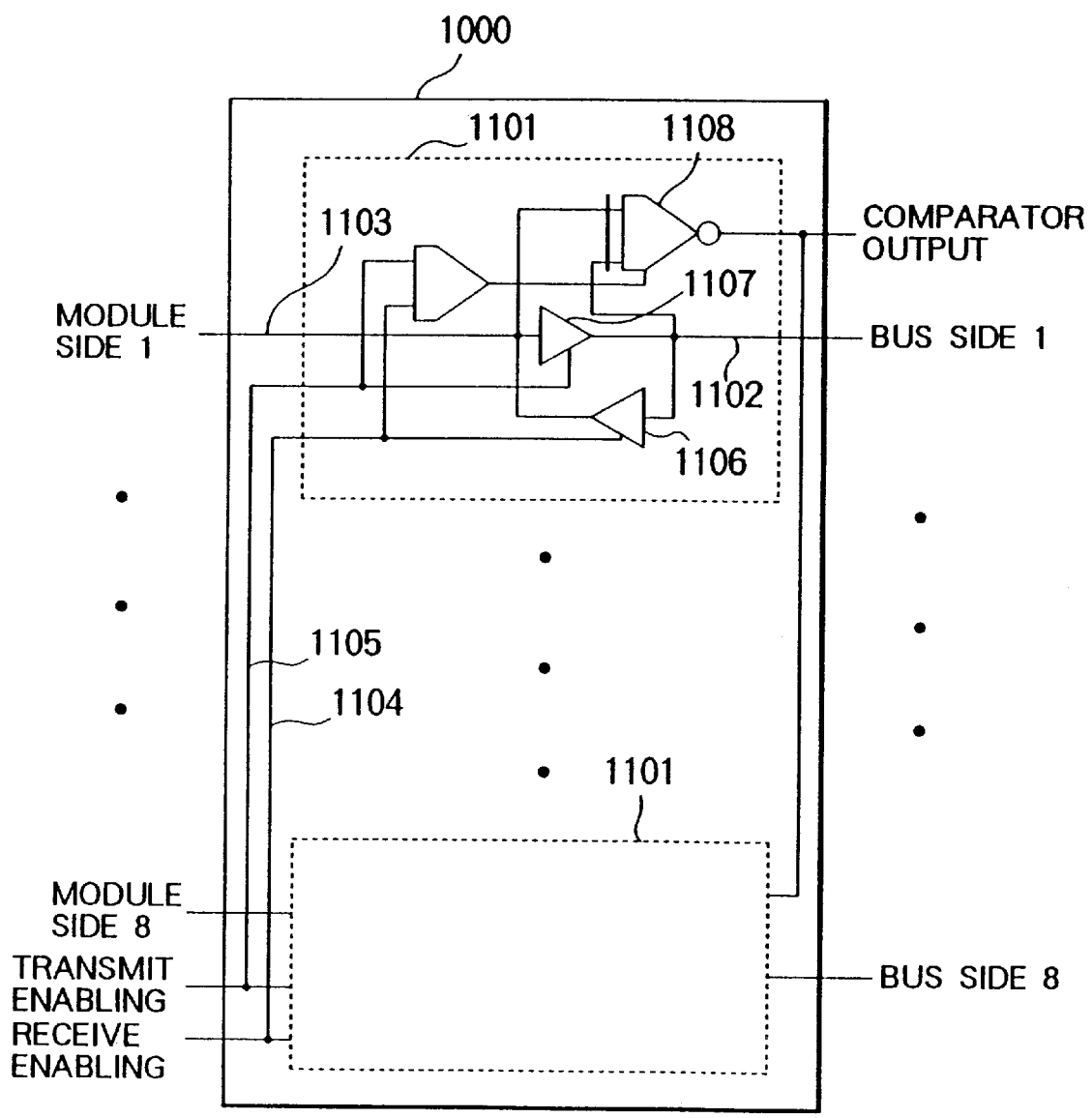
FIG. 1 is a logic circuit diagram of a bus transceiver with a comparator according to an embodiment to further improve the present invention by hardware.
Figure 2:
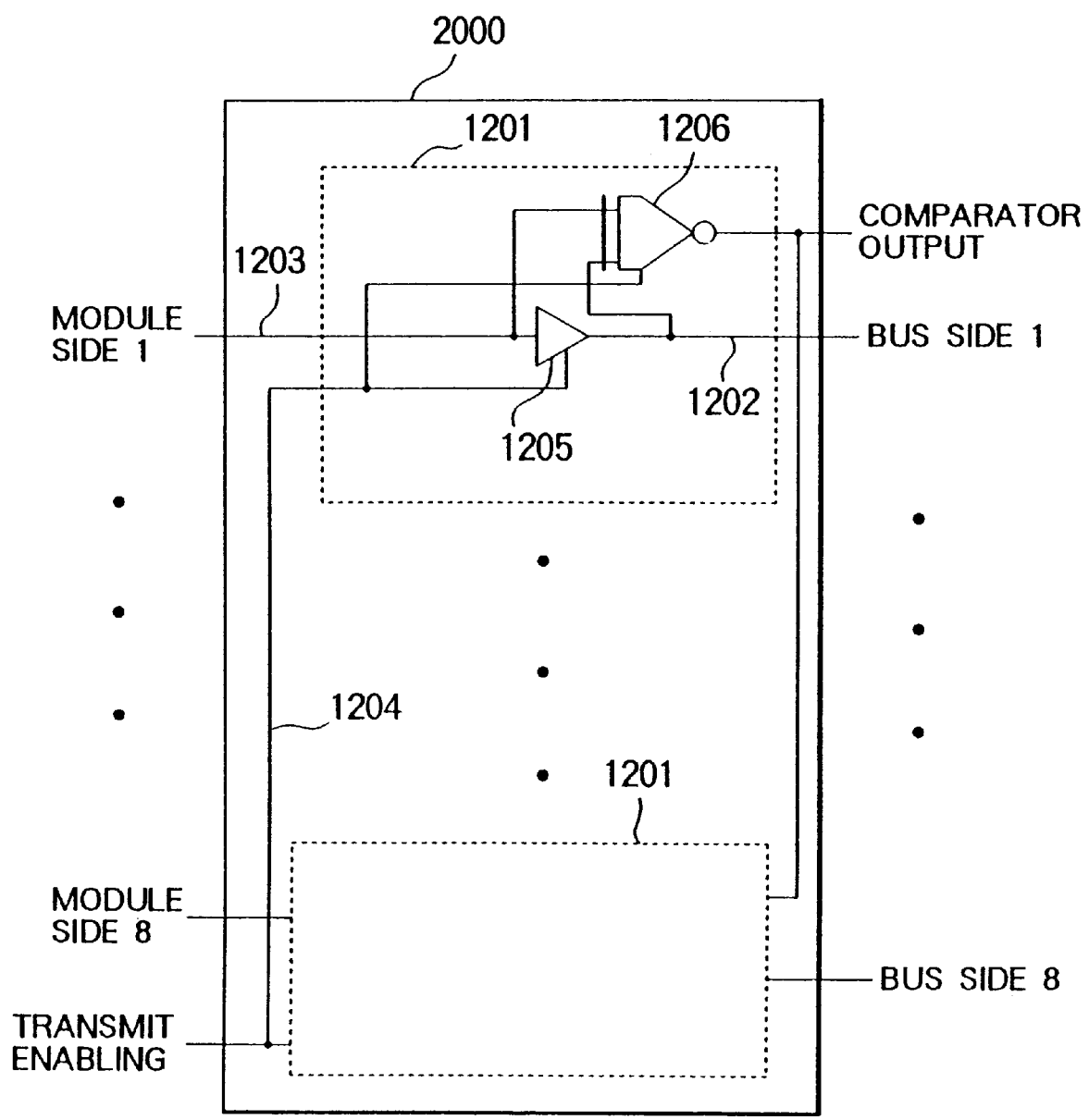
FIG. 2 is a logic circuit diagram of a bus buffer with a comparator according to an embodiment to further improve the present invention.
Figure 3:
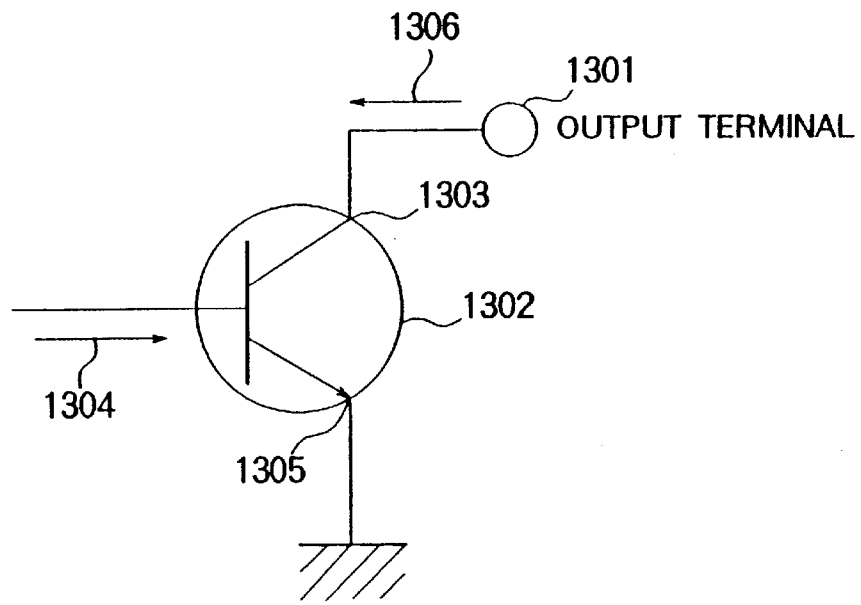
FIG. 3 is a diagram showing a known output circuit which may be used with a comparator of a bus buffer according to an embodiment of the present invention.

FIG. 1 is a logic circuit of a bus transceiver with a comparator according to an embodiment to improve the reliability of the data processing system by hardware. FIG. 2 is a logic circuit of a bus buffer with a comparator according to the embodiment to improve the reliability of the data processing system by hardware. Those circuits are formed as IC circuits. FIG. 3 is an output equivalent circuit of the comparator of the bus buffer according to the embodiment.

As shown in FIG. 1, in this embodiment, the bus transceiver with a comparator has eight 1-bit transceivers 1101 accommodated in an IC package 1000. The 1-bit transceiver 1101 has a bus signal 1102, a module signal 1103, a receive enabling signal 1104, and a transmit enabling signal 1105.

Reference numeral 1106 denotes a bus receiver for receiving a value of a signal on the system bus, and 1107 denotes a bus transmitter for sending a signal from the module onto the bus. The bus receiver 1106 and the bus transmitter 1107 are controlled so as to be active or inactive by a receive enabling signal 1104 and a transmit enabling signal 1105, respectively. When they are deactivated, they have outputs in high-impedance state and are electrically equivalent to not being connected in the circuit. Reference numeral 1108 denotes a comparator, which has a logic 1 output only when the value of a signal on the bus coincides with the logical value in the module. This action is the same as that of an exclusive-NOR gate. The comparator 1108 is activated when either the receive enabling signal 1104 or the transmit enabling signal 1105 is true, and when deactivated, the comparator 1108 has its output in high-impedance state and is electrically equivalent to not being connected in the circuit.

The bus buffer with a comparator in FIG. 2 has eight 1-bit buffers 1201 accommodated in an IC package 2000. The 1-bit buffer has a bus signal 1202, a module signal 1203, and a transmit enabling signal 1204. Reference numeral 1205 denotes a bus transmitter for sending a signal from the module onto the bus. The bus transmitter 1205 is controlled to be active or inactive by a transmit enabling signal 1204, and when the bus transmitter 1205 is deactivated, its output is in a high-impedance state and is equivalent to not being connected in the circuit.

Reference numeral 1206 denotes a comparator, which has a logic 1 output only when the value of a signal on the system bus coincides with the logical value in the module. This action is the same as that of an exclusive-NOR gate. The comparator 1206 is activated when the transmit enabling signal 1204 is true, and when deactivated, the comparator 1206 has its output in the high-impedance state like in the bus transmitter, and is electrically equivalent to not being connected in the circuit.

It ought to be noted that in this embodiment, outputs of all comparators are connected together in the IC to produce a single output, which is output from a signal pin. Needless to say, independent single pins can be allocated to outputs of the comparators.

FIG. 3 is a known output equivalent circuit which may be used with a comparator of a bus buffer according to an embodiment of the present invention. This circuit is known as an open collector circuit, and as shown in FIG. 3, an output terminal 1301 is directly connected to a collector 1303 of an output transistor 1302. When an appropriate base current 1304 is supplied to the output transistor 1302, the collector 1303 and the emitter 1305 conduct, so that a signal current 1306 can be drawn in from the output terminal 1301. In this embodiment, this state is used as a logic 0. On the other hand, if the base current 1304 is cut off, the collector 1303 and the emitter 1305 cease to conduct, and the collector 1303 is now equivalent to being electrically connected to nothing. At this time, the output terminal too is equivalent to being electrically connected to nothing and, in this embodiment, this state is used as a logic 1.

As is well known, by connecting together the outputs of gates having the above-mentioned open collector circuits, it is possible to form the so-called wired AND circuit having an equivalent logic as the AND gate. In this embodiment, by connecting together all outputs of the comparators to form a wired AND circuit to output a logic 1 only when outputs of all comparators are at the 1 level, an output is obtained which indicates whether or not the values of signals which should coincide between the bus and the modules coincide with each other. Needless to say, it is possible to connect outputs of the comparators by using an ordinary AND gate without using a wired AND circuit or form a circuit having a wired AND and ordinary AND gates connected mixedly therein.

Figure 4:
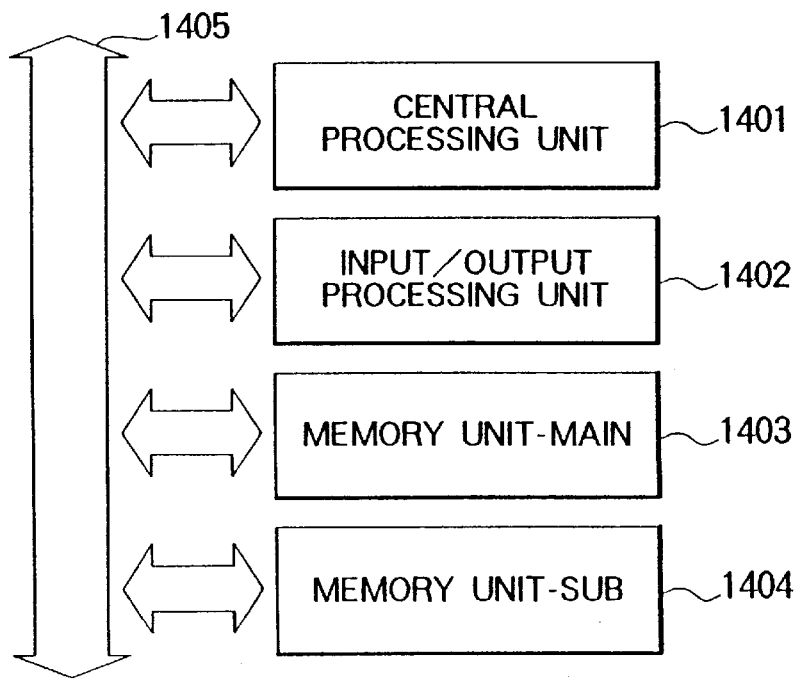
FIG. 4 is a block diagram of a known data processing system with duplicate memory units to which the present invention is advantageously applied.

FIG. 4 is a block diagram of a known data processing system with a multiplexed memory to which the present invention advantageously is applied. Reference numeral 1401 denotes a central processing unit, 1402 denotes input/output processing unit, 1403 and 1404 denote main and sub memory units for storing programs and data, and 1405 denotes a system bus for transferring data and control signals among those units. The memory units 1403 and 1404 are duplicate units, so that it is expected that when data is written, the same value is always written and when data is read, the same value is always output in both memory units.

Figure 5:
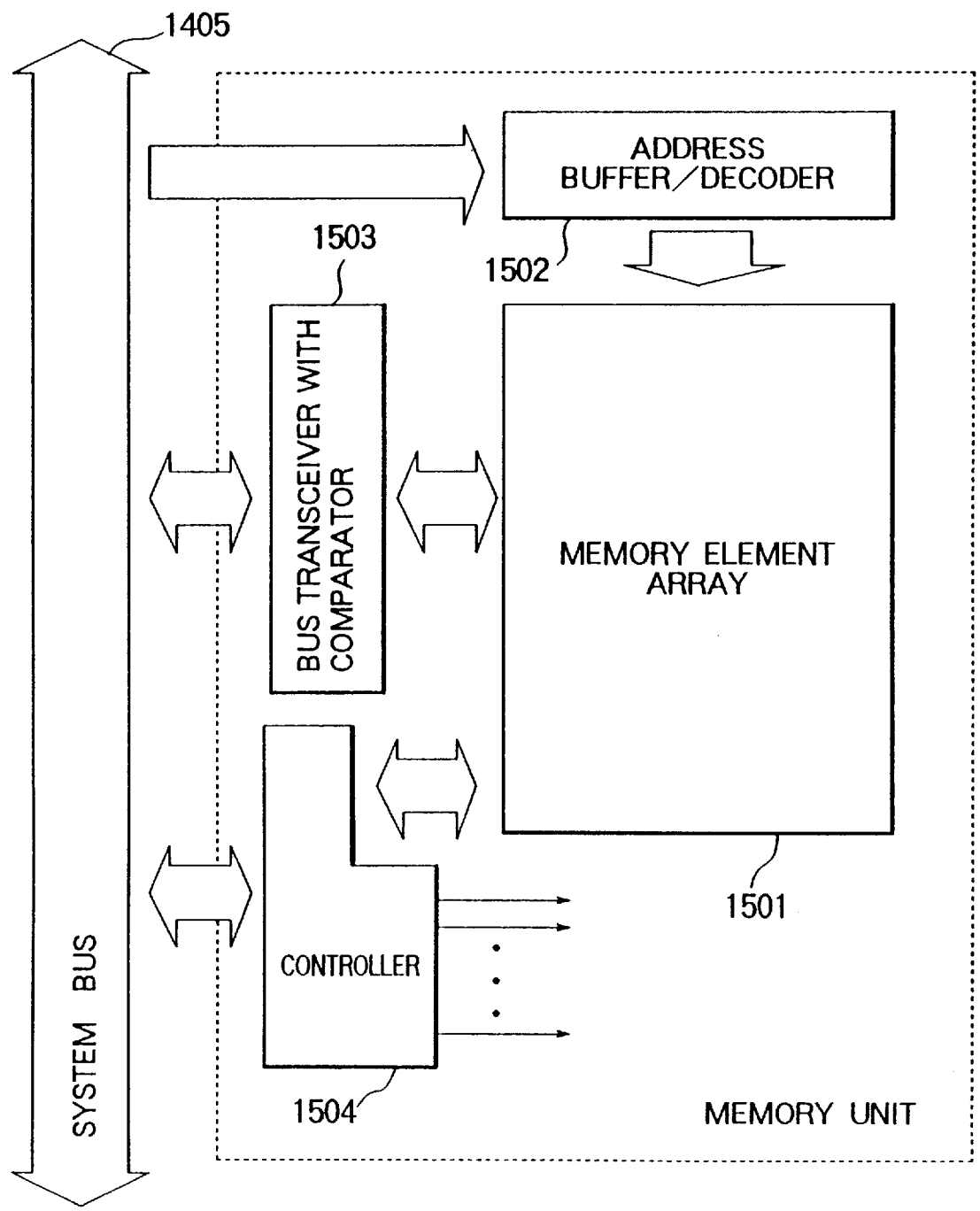
FIG. 5 is a block diagram showing memory units shown in FIG. 4 to which the present invention is applied.

FIG. 5 is a block diagram showing an example of the memory units 1403 and 1404 in FIG. 4 to which the present invention is applied. Reference numeral 1501 denotes a memory element array, 1502 denotes an address buffer/decoder, 1503 denotes a bus transceiver with a comparator of the present invention, which is located between the system bus and the memory element array and transfers data between them. Reference numeral 1504 denotes a controller to generate timing signals necessary for the operation of the respective blocks mentioned above.

Figure 6:
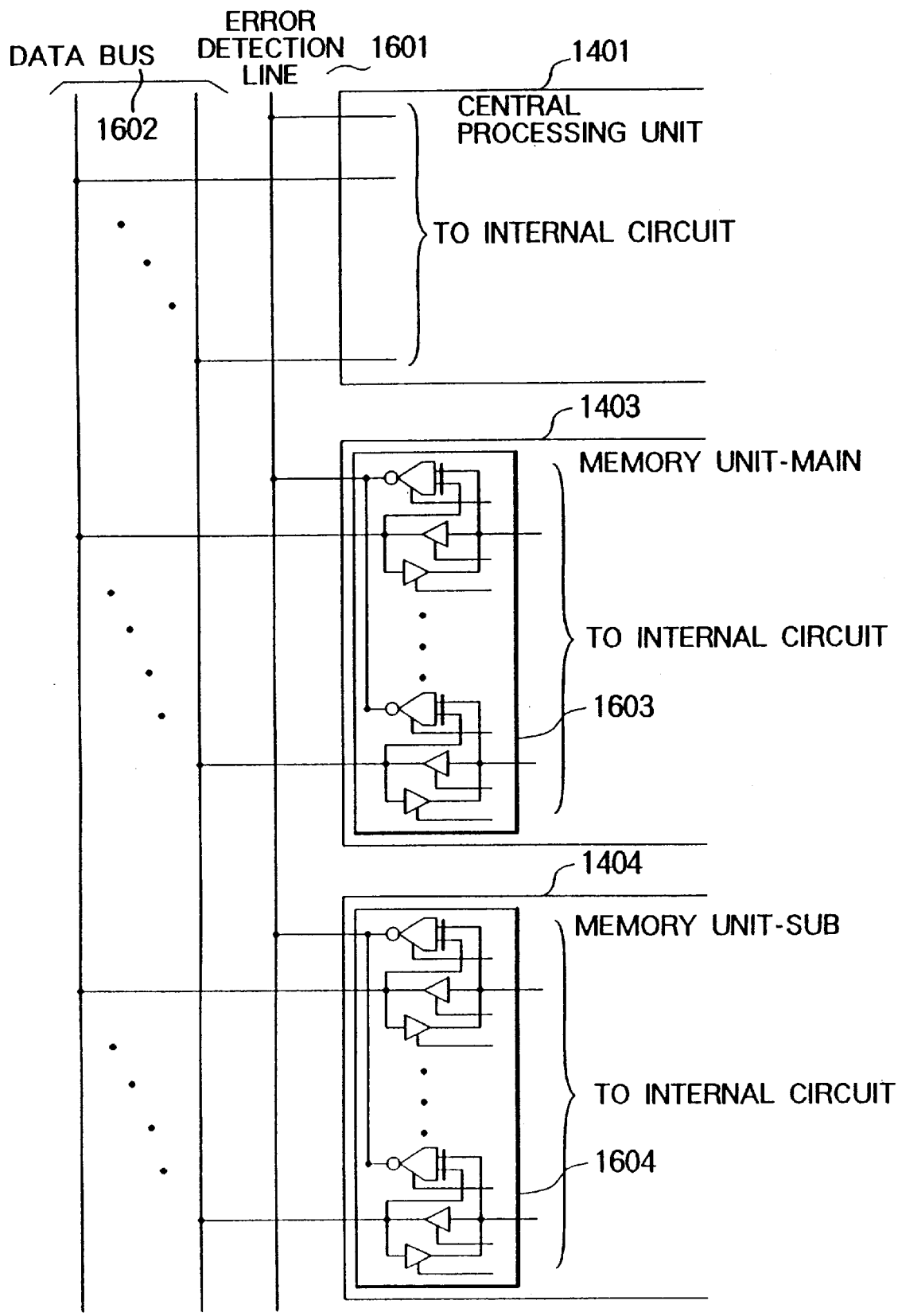
FIG. 6 is a structural diagram of a main part of a data processing system shown in FIG. 4 to which a transceiver with a comparator according to an embodiment of the present invention is applied.

FIG. 6 shows a construction of this embodiment with attention given to the bus and the transceivers. For clear understanding of the figure, address lines and control lines are omitted which are not related to the following description.

The data bus transceivers each use a memory unit main 1403 and a memory unit sub 1404 according to this embodiment, and the outputs of the data-bit comparators are connected to an error detection line 1601 to form a wired AND circuit.

When writing data, the central processing unit 1401 outputs data onto the data bus 1602, and the bus transceivers 1603 and 1604 of the memory units 1403 and 1404 receive the data to accept it into the memory units. At this time, the comparators of the bus transceivers each make a decision whether or not data on the data bus 1602 has been correctly input into the memory units. The results of decisions are collected by the wired OR circuit formed by using the error detection line 1601, and the result of ORing is sent to the central processing unit 1401.

On the other hand, when reading data, a data word, which is read out onto the data bus 1602 by the bus transceivers 1603 and 1604 from the memory units 1403 and 1404 in response to a command from the central processing unit 1401, is outputted. As described above, the output circuits of the bus transmitters of the bus transceivers 1603 and 1604 are configured as the open-collector TTL circuits and, therefore, the bit lines of the data bus are connected together to form a wired AND connection. When both memory units output on a bit line a logic 1 signal, logic 1 signal appears on their bit line, so that a signal of logic 1 is input to the central processing unit. If at least either of the memory units outputs a logic 0, the logical value of the bit line becomes a logic 0, and a logic 0 is input to the central processing unit. In other words, only when both memory units output logic a 1 signal, does the central processing unit recognize the logical value for that bit as 1.

Now let us suppose that owing to a fault in the memory unit main 1403, the logical value of a certain bit at a given address is predetermined at 0. After the central processing unit 1401 has written 0 at this bit position in the two memory units, when data at the same address is read, both the normal memory unit sub 1404 and the fault-occurring memory unit main 1403 output 0 signals at this bit line. At this time, in both comparators, the logical values in the memory units coincide with the logical value from the data bus, so that all comparators output 1 signals, so that an error does not occur.

Then, after 1 is written in this out-of-order bit position, when the data word at the same address is read, the memory unit sub 1404 in normal condition outputs a logic 1 on the data bus, while the memory unit main 1403 suffering the fault outputs a logic 0. In this case, since the wired AND connection is formed including the said bit line of the data bus, the central processing unit 1401 recognizes the data at this bit position as a logic 0. At this time, in the comparator of the bus transceiver 1603 of the fault-containing memory unit main 1403, the values on the data bus and in the memory unit coincide with each other. However, in the comparator of the bus transceiver 1604 of the memory unit sub 1404 in normal condition, the values on the data bus and in the memory unit do not coincide with each other, and the comparator output is a logic 0 on the error detection line. As a result, the logical value of the error detection line is 0, so that the central processing unit 1401 detects the occurrence of the fault.

As described above, when the two memory units 1403 and 1404 output different values onto the data bus, the different values are detected by the comparators of the bus transceivers and, consequently, the logical value on the error detection line goes to the 0 level, by which the central processing unit can detect the occurrence of the fault. It ought to be noted, however, that when both memory units output wrong but same values, those faults are not detected. It goes without saying that such double faults cannot be coped with by the dualization of the system.

According to the present invention, the coincidence of results of a plurality of modules can be detected by coincidence between the value of a signal on the bus and the values of signals in the modules, so that the reliability of the data processing system can be enhanced also in terms of hardware.

We claim:

1. A buffer device for transmitting signals used in a data processing system comprising a central processing unit, an input/output processing unit, a memory unit for storing programs and data, and a system bus for transferring data and control signals among said units, wherein said buffer device includes one or more comparators, each comparing a value of a first signal, applied at a first input thereof via one end side of said buffer device, and a value of a second signal, applied at a second input thereof via another, opposing end side of said buffer device, said buffer device having an output terminal being connected to a line of said system bus for providing an indication when the first and second signal values differ during actual operation of said data processing system, and said buffer device being included in a semiconductor chip or IC package.

2. A buffer device according to claim 1, wherein said one or more comparators include a plurality of comparators each having an output circuit coupled thereto, each said output circuit having two operating states one of which is an open terminal potential and the other is ground potential, said plurality of comparators having outputs thereof connected to a single signal line to form a wired AND circuit.

3. A buffer device according to claim 2, wherein each said first signal is indicative of a signal value in said memory unit and each said second signal is indicative of a signal value in said system bus.

4. A buffer device according to claim 3, wherein each said comparator includes an EX-NOR gate.

5. A buffer device according to claim 1, wherein each said first signal is indicative of a signal value in said memory unit and each said second signal is indicative of a signal value in said system bus.

6. A buffer device according to claim 1, wherein each said comparator includes an EX-NOR gate.

7. A data processing system comprising a central processing unit, an input/output processing unit, a plurality of independent memory units for storing programs and data, and a system bus for transferring data and control signals, said system bus having a data bus and an error detection line, wherein each memory unit is connected to said system bus through a buffer device including one or more comparators each comparing a value of a first signal, applied at a first input thereof via one end side of said buffer device, and a value of a second signal, applied at a second input thereof via another, opposing end side of said buffer device, each said buffer device being included in the same chip or IC package as said corresponding memory unit, each said buffer device having an output terminal connected to said error detection line for providing an indication when the first and second signal values differ, and wherein each said comparator compares a value of a signal on a line of said data bus and a value of a corresponding signal in the memory unit corresponding thereto and sends onto said error detection line a signal representing the coincidence or non-coincidence of a signal transmitted between said data bus and the memory unit during actual operation of said data processing system.

8. A data processing system according to claim 7, wherein the plurality of memory units are arranged to provide output signals onto said system bus simultaneously, and wherein by comparing a value of a signal on said line of said data bus and a value of a corresponding signal in a memory unit by a comparator of a buffer device of each memory unit, the coincidence or non-coincidence of an output of said memory unit with that of outputs of other memory units outputting signals onto said error detection line of the system bus simultaneously with said memory unit can be made known.

9. A data processing system according to claim 8, wherein each said comparator includes an EX-NOR gate.

10. A data processing system comprising a central processing unit, an input/output processing unit, a plurality of independent memory units for storing programs and data, and a system bus for transferring data and control signals, said system bus having a data bus and an error detection line, wherein each memory unit is connected to said system bus through a buffer device including one or more comparators each comparing a value of a first signal, applied at a first input thereof via one end side of said buffer device, and a value of a second signal, applied at a second input thereof via another, opposing end side of said buffer device, each said buffer device being included in the same chip or IC package as the corresponding memory unit, and also has an output terminal connected to said error detection line to show that said two values differ, wherein said comparator compares a value of a signal on a line of said data bus and a value of a corresponding signal in the memory unit and sends onto said error detection line a signal representing the coincidence or non-coincidence of a signal transmitted between said data bus and the memory unit, and wherein the non-coincidence of said signal transmission is treated as a fault of a test during actual operation of said data processing system.

11. A data processing system according to claim 10, wherein each said comparator includes an EX-NOR gate.

* * * * *